June 10, 1969 I. A. ANTLES 3,448,723
FINGERPRINTING MEANS
Filed Dec. 12, 1966 Sheet 1 of 2

INVENTOR.
IRA A. ANTLES
BY Price & Heneveld
ATTORNEYS

INVENTOR.
IRA A. ANTLES
BY Price & Heneveld
ATTORNEYS

3,448,723
FINGERPRINTING MEANS

Ira A. Antles, 173 W. 28th St., Holland, Mich. 49423

Filed Dec. 12, 1966, Ser. No. 601,065
Int. Cl. B23q *3/18*; B05c *11/12*
U.S. Cl. 118—503 8 Claims This invention relates to the taking of fingerprint specimens, and more particularly to a unique means by which the taking of fingerprints is greatly facilitated.

As is well known, fingerprinting is an art which has been in use for a very long time in the identification of individuals, particularly in police work. So far as is known, fingerprint specimens have always been taken in the same way. First, ink is applied to a flat plate, usually with a roller, a given finger is then placed on the inked plate and rolled to coat the fleshy tip portion of the finger with ink, and the finger is then placed on its side upon a card which has a desired arrangement of places for recording prints from each finger. The inked finger is then rolled carefully in a single movement upon the card to record a two-dimensional print thereon. Owing to the nature of the joints involved in the fingers and arm, the entire forearm, wrist, and hand must all be rolled in order to roll the finger in this manner. This presents a difficulty, since such a rolling movement is an unnatural and an awkward one, and frequently the print placed upon the card is blurred and inaccurate as a result of the finger having moved laterally even slightly upon the card instead of rolling perfectly across it. Further, as other fingers on one hand are inked and their prints recorded upon the card other problems develop, since each finger in turn becomes coated with ink, and this is not removed from one finger before another finger is printed. Consequently, the rolling movement of subsequent fingers frequently brings a part of some of the previous fingers into contact with the print-recording paper or card, thereby placing numerous smudges upon it, which cannot afterward be removed.

The present inventor has conceived of the unique idea that while it seems essential that the finger whose print is being taken and the fingerprint image-recording member or card be rolled with respect to each other, it is a basic mistake to try to roll the finger upon the card. Instead of this, the finger should be held absolutely stationary, while the card is rocked or moved in an arcuate path around the finger to follow the generally cylindrical or slightly conical surface configuration of the finger. It is a simple matter to hold an inked finger stationary, and doing this while moving the card eliminates the numerous problems which have become notorious in this field.

Accordingly, it is a major object of the present invention to provide means for the taking of fingerprints, in which the fingerprint image-recording member is moved and the finger itself is held stationary.

It is a further major object of the invention to provide a new and unique device for carrying out the method indicated above.

Further important objects of the invention are to provide a device of the aforesaid character embodying a novel design for the table means which holds the image-recording card, which includes a means for operating the device with the foot, and which further includes means for locking or latching the table means carrying the image-recording card or member so that the latter cannot be moved, thus facilitating the simultaneous taking of fingerprints of a plurality of fingers held together.

The foregoing major objects of the invention and the advantages provided thereby, together with other objects and advantages equally a part thereof, will become increasingly apparent following consideration of the ensuing specification and its appended claims, particularly when taken in conjunction with the accompanying illustrative drawings setting forth a preferred embodiment of the invention.

Briefly stated, the present invention provides a new means for the taking of fingerprints in which a fingerprint image-recording member or card is moved while the finger itself is held stationary. The invention further provides an apparatus which comprises a table means for holding a fingerprint image-recording member, a support means for the table means which provides for pivotal movements of the latter, such that a finger may be placed on said member and held stationary while the table means and the image-recording member are pivoted with respect to such finger, and means for moving the said table means upon the said support means when the finger is held stationary and it is desired to move the table means in the aforesaid manner.

Figure 1:
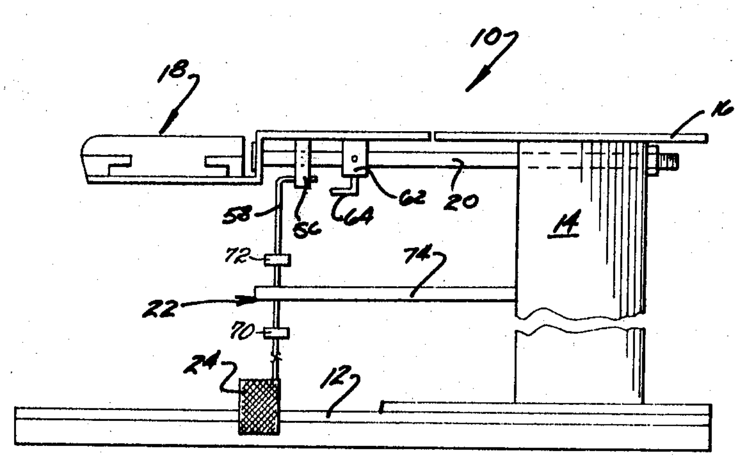
FIG. 1 is a side elevation of the novel device.

Referring now in more detail to the drawings, the apparatus is illustrated generally at 10 in FIG. 1, where it may be seen that the apparatus 10 comprises generally a base 12, a pedestal or column 4 which preferably has a flat plate 16 attached to its top in a horizontal position, a table means 18 which is supported in a horizontal position by a beam 20 extending cantilevered from the top of the pedestal 14, and a linkage arrangement 22 including a foot pedal 24, by which the table means 18 may be pivoted or rotated in a vertical plane about the beam 20 as an axis.

Figures 2, 3:
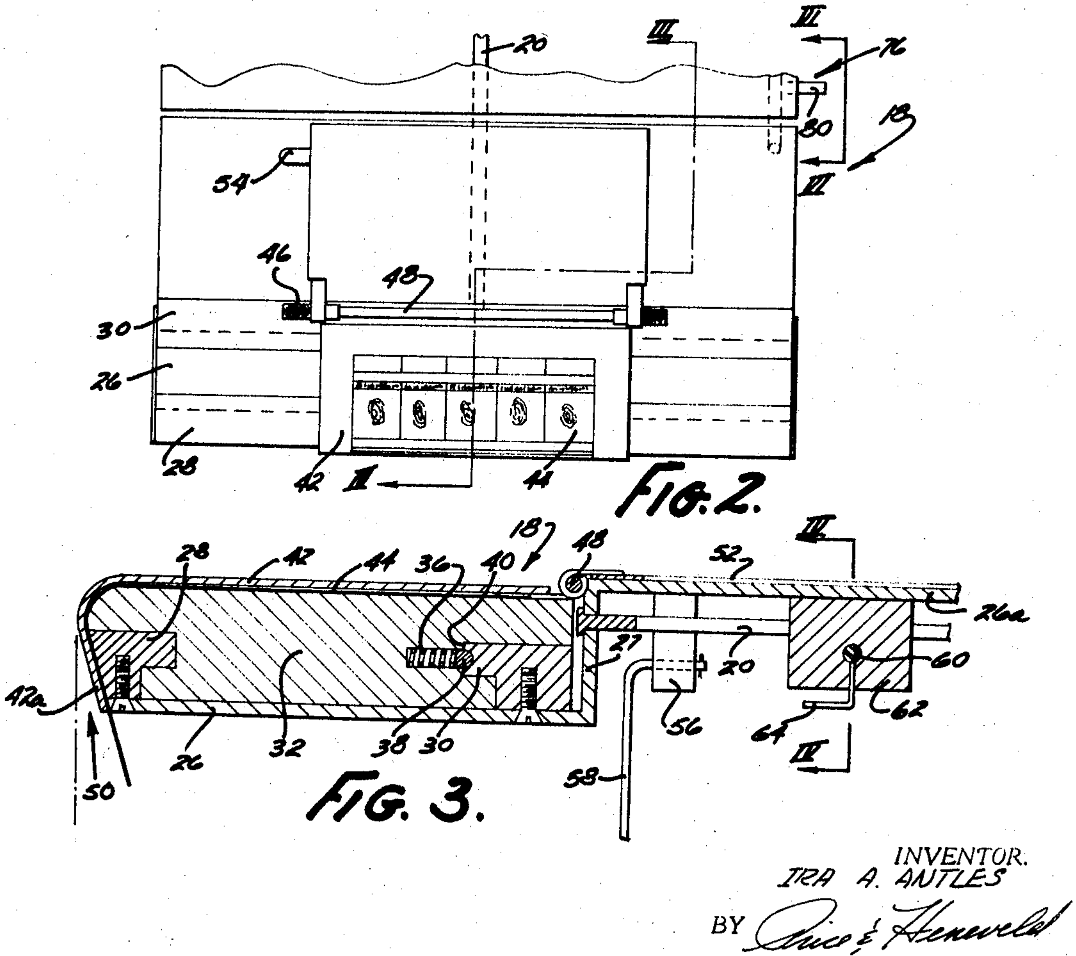
FIG. 2 is an enlarged, fragmentary, overhead plan view of the table means of the device.
FIG. 3 is an enlarged fragmentary sectional elevation taken through the vertical plane III—III of FIG. 2.

Details of the table means 18 are best seen in FIGS. 2 and 3. It will there be seen that the table means comprises a lower plate 26 which is perpendicularly offset from itself near its center to define a web 27. The support beam 20 which suspends the table means 18 in the cantilevered fashion seen in FIG. 1 is in essence a long, heavy shoulder bolt which passes through an aperture in the web portion 27 of the lower plate 26 and is in this manner journalled in the web portion. Thus, since the opposite end of the beam or bolt 20 is fixed to the top portion of the pedestal 14, it will be observed that the entire table means 18 may be pivoted or rotated upon the beam 20.

On the portions of the lower plate 26 forwardly of the beam 20 are mounted a pair of inverted L-shaped guide bars 28 and 30 which define therebetween an inverted T-shaped slot or guideway. Slidably mounted within this guideway is a platform structure 32 which in essence comprises a block or thick plate having flat upper extremities and a T-shaped lower extremity arranged to slide between the two guide bars 28 and 30. The platform structure 32 is approximately only one-half as wide as the bottom plate 26 (FIG. 2), and is slidable laterally across the top of the plate and guide bars 28 and 30 within the guideway defined thereby.

Preferably, means are provided by which such lateral sliding motion is indexed at desired points. Such a means may comprise a small coil spring 36 seated in a cylindrical hole in the platform structure 32. Spring 36 biases a ball 38 continually against the inwardly-directed face 40 of guide bar 30, in which a series of concave detents are formed, such that as the platform structure 32 is moved laterally on its guideway, the ball 38 will come into register with each such detent and be urged thereinto by the force of the spring 36. If the platform is pushed no further, the spring and ball will hold the platform at that particular position. However, if the platform is pushed from that position, the spring will be slightly compressed as the ball is urged out of its detent and towards the spring, and the ball will then travel along the face 40 until it encounters the next such detent.

Atop the platform 32 is mounted a frame member 42 which overlies the flat top of the platform for the purpose of holding a fingerprint card 44 or other such fingerprint image-recording means in a stationary position atop the platform 32. As seen in FIG. 2, the frame member 42 defines a rectangular central opening through which the card 44 is visible and accessible.

The frame 42 is swingably mounted atop the platform 32 upon hinge means 46 which include a rod 48 forming the pintle of the said hinge means. Thus, the frame may be swung upwardly to release the card 44 for replacement or other purposes. It will be noted that the end extremity of the frame 44 which is opposite from the hinge 46 includes a lip portion **42*a*. This lip portion, like the front side of the guide bar 28, is angled downwardly and rearwardly in a vertically-recessed configuration indicated by the angle 50. The purpose for this will be explained subsequently. A cover plate 52 is also hinged at 46 upon pintle rod 48. The cover plate is a thin, flat plate of sheet metal or the like having a handle 54 at one side, which may be grasped to swing the cover plate about the pintle 48. When swung backward over the frame 42, cover plate 52 overlies and covers the frame and the card 44 held in place thereby, as when the apparatus is not in use. When the apparatus is to be used, the cover 52** may be swung back to the position shown in FIG. 2, and fingerprinting ink may be rolled upon the surface of the cover which is then upward, to facilitate the use of the apparatus in the taking of fingerprint specimens.

Figure 4:
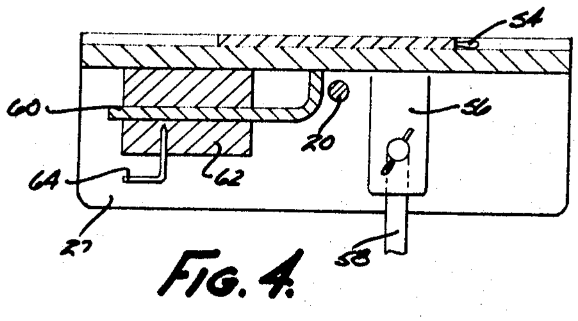
FIG. 4 is an enlarged fragmentary sectional elevation taken through the plane IV—IV of FIG. 3.

As best seen in FIGS. 3 and 4, the rearward portion **26*a* of the lower plate 26 has a depending flange projection 56 secured thereto which has a hole bored through it to receive the upper end of a linkage rod 58 forming part of the linkage system 22 seen in FIG. 1. The flange projection 56 is spaced laterally or radially of the beam 20, such that a pull on the rod 58 will pivot the lower plate 26 and the entire table means 18 of which the plate is a part about the rod or beam 20. A J-shaped support 60 is also secured to the bottom of portion 26*a* of the lower plate 26 so as to extend at right angles to the beam or rod 20. Support rod 60 slidably carries a counterweight 62, whose position along the length of the rod 60 may be adjusted through actuation of a set screw 64 which preferably has an offset handle for facilitating manual tightening and loosening thereof. The counterweight 62 provides a constant biasing force which tends to pivot the table means 18 about the beam 20 in a direction opposite to that instituted by actuation of the linkage system 22**, so that manual pivoting of the table means is made smoother and more easily controlled.

Figure 5:
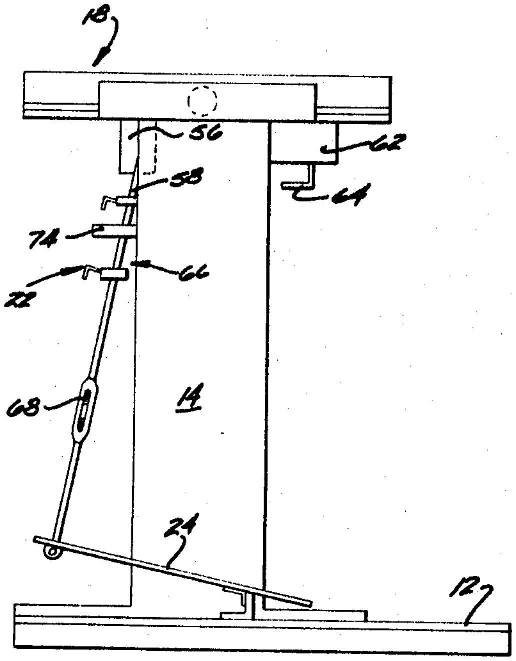
FIG. 5 is an enlarged frontal end elevation of the structure seen in FIG. 1.

The linkage system 22 noted previously is best seen in FIGS. 1 and 5, and comprises the linkage rod 58 and flange projection 56 already noted, together with a stop means 66 providing limits for the allowable movement of the linkage rod 58, and a turn buckle 68 interposed in the linkage rod 58 to provide for shortening and lengthening thereof. As noted previously, the foot pedal 24 is pivotally attached at its upper end to the bottom of linkage rod 58, and is hinged to the top of the base 12. Thus, it will be apparent that by pushing downwardly on the foot pedal 24 the linkage rod 58 will be moved downwardly, thereby pulling on the flange 56 and pivoting the entire table means 18 about its support beam 20, in a counterclockwise direction as seen in FIG. 5. Downward force applied to the foot pedal 24 is opposed by the weight of the counterbalance 62, whose effect may of course be varied by moving it along the support rod 60 upon which it is mounted. Consequently, when there is no downward force applied to foot pedal 24, the counterweight 62 will cause the table means 18 to pivot in a clockwise direction as seen in FIG. 5 to a rest position, determined by the stop means 66. This comprises a lower stop collar 70 and an upper stop collar 72 which are slidably positionable along the linkage rod 58, together with an arm 74 which extends outwardly from the column 14 and has an aperture through which the linkage rod 58 passes. Consequently, the aforesaid rest position will be determined by the point at which the lower stop collar 70 comes into abutting contact with the bottom surface of arm 74, whereas the maximum pivoted position caused by a downward movement of the foot pedal 24 will be determined by the point at which the upper stop collar 72 comes into contact with the upper surface of the arm 74.

It is to be noted that, as best seen in FIG. 5, the moment arm formed by the distance along the foot pedal 24 between its connection to the base 12 and the rod 58 is preferably approximately twice the moment arm located between the beam or rod 20 and the flange 56 to which the other end of rod 58 is attached. Consequently, the table means 18 will move an angular distance which is twice that required for corresponding actuation by movement of the foot pedal. It will be recognized that this is a desirable feature, since comfortable movement of the foot by pivoting the ankle joint is definitely limited, and by the aforesaid moment arm relationship a full ninety degree movement of the table means requires only a forty-five degree movement of the foot upon the foot pedal.

Figure 6:
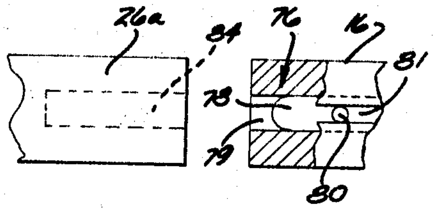
FIG. 6 is an enlarged, fragmentary elevational view taken through the plane VI—VI of FIG. 2.

It is sometimes desirable to take a fingerprint specimen of a plurality of fingers, such as for example all of the fingers of one hand except for the thumb. When this is to be done, the table means 18 should remain in a level horizontal position and should not pivot. A latch means 76 (FIGS. 2 and 6) is provided for holding the table means 18 in such a steady position. The latch means 76 comprises a cylindrical plunger 78 located in a passage 79 bored into the plate 16 which is secured to the top of the column 14, together with an operating handle 80 which extends out the side of the plate 16 through a horizontal slot 81 formed therein which communicates with the passage 79 inside the plate in which the plunger 78 is located. A corresponding passage 84 is bored into the portion **26*a* of the table means 18 in direct alignment with the plunger 78, so that when it is desired to latch the table means, the operating handle 80 may be moved forward to slide the bolt or plunger 78 into the passage 84, thereby locking the table means in alignment with the plate 16** atop the column.

In operating the apparatus of the invention, the cover 52 is lifted upwardly and rested in the position shown in FIG. 2, and the frame member 42 is raised to place a fingerprint card 44 in the desired position, after which the frame member 42 is once again placed in its lower position (seen in FIG. 3) where it holds the card 44 securely in place. In this connection, it is to be noted that the downwardly-angled lip portion **42*a* of the frame should be sufficiently resilient so that it may be flexed out of its seated position shown in FIG. 3 and allow raising of the frame member as a unit. Ink is then applied to the exposed surface of the cover 52, and a finger whose print is to be taken is rolled upon the cover 52** so as to be covered with ink therefrom.

With the table means 18 in its rest position, i.e., pivoted clockwise a moderate amount from the position shown in FIG. 5, the finger bearing the ink is then held horizontally and placed against the card 44 in a predesignated area thereupon. The finger is then held stationary with a light downward pressure against the face of the fingerprint card, and an operator places his foot on foot pedal 24 and pushes downwardly. This pivots or rotates the table means 18 about its support beam 20 to the position determined by stop collar 72 of the stop means 66, in which the table means will have rotated to a tilted position at an angle to the vertical which is about the same as but opposite from that occupied in its rest position. During such movement, the platform structure 32, including its frame 42 and the fingerprint card 44, will all be rolled about the inked finger, with the fingerprint card following the periphery of the finger. During such pivotal movement, the angle 50 which the outwardly extending end of the platform structure defines becomes significant, since this recessed configuration allows the other fingers of the subject being fingerprinted to occupy a more natural position. That is, it is much more natural and comfortable for a person to hold one finger straight out and the other fingers angled slightly downwardly than it is to hold such other fingers straight vertically downward from the extended finger, as would be required if the end of the platform structure dropped vertically downward.

The single pivoting movement of the table means 18 described just above records the full print of the finger placed against the card 44. Consequently, as soon as the travel of the table is limited by the stop means 66 in the aforesaid manner, the finger is withdrawn from the card, and the operator releases his foot from the foot pedal 24. This allows the counterweight 62 to immediately pivot the table means 18 back to its rest position, in which the next succeeding finger is inked upon the top of the cover 52 and applied to the appropriate area on the fingerprint card. The foot pedal is then depressed once again, and this procedure is repeated for each individual finger. When each individual finger has been printed separately, the table means 18 is locked into its horizontal position by actuation of the latch means 76. All four fingers just printed individually are then coated with ink, placed upon another area of the card 44, and pushed downwardly thereupon to record the print of all four fingers simultaneously. Due to the presence of the latch means 76, the table means 18 cannot move during this operation. This completes the fingerprinting process for one hand, and it is duplicated for the remaining hand.

In accordance with the foregoing, it will be immediately apparent to those concerned with the taking of fingerprints that a completely new and unique method and apparatus has been provided which will greatly facilitate fingerprinting in the future by providing superior results in a more easy and efficient way. This invention represents the first significant change in fingerprinting procedures in many, many years, and indeed has already been recognized as such by persons in police administration to whom the invention has been shown.

It is entirely conceivable that upon examining the foregoing disclosure, those skilled in the art may devise embodiments of the concept involved which differ somewhat from the embodiment shown and described herein, or may make various changes in structural details to the present embodiment. For example, the counterbalancing force provided by the counterweight 62 could also be provided by a suitable spring connected to the table means 18 or to the linkage system 22. Similarly, the stop means 66 could be changed to a system of stop blocks associated directly with the foot pedal 24 and/or the base 12. Consequently, all such changed embodiments or variations in structure as utilize the concepts of the invention and clearly incorporate the spirit thereof are to be considered as within the scope of the claims appended herebelow, unless these claims by their language specifically state otherwise.

I claim:

1. Apparatus for the taking of fingerprint specimens, comprising in combination: means including a generally horizontally disposed table for holding a fingerprint image-recording card member; a horizontally extending support member; means supporting said table for pivotal movement about a horizontal aixs of said support member; means to oscillate the table about said axis; means to limit the extent of pivotal movement during such table-oscillation; and means for retaining said card member on the table, such that a finger may be placed on said image-recording member and held stationary while said table and recording member are pivoted with respect to such finger to record the peripheral characteristics of the finger on the recording member.

2. The apparatus defined in claim 1, wherein said means to oscillate comprises a manually operable linkage system.

3. The apparatus defined in claim 2, wherein the means to limit comprises adjustable stop means incorporated in said linkage system.

4. The apparatus defined in claim 3, wherein said linkage system includes counterbalance means for urging said table means in one direction of said pivotal movement to at least partially oppose the force applied through said linkage system.

5. The apparatus defined in claim 3, wherein said linkage system includes a foot pedal by which such system is operated to cause said pivotal movement.

6. The apparatus defined in claim 1, wherein said table includes a frame member swingably mounted to overlie parts of the table surface and said frame comprises the means to retain the image-recording card member on the table.

7. The apparatus defined in claim 1, wherein an edge-side of said table is vertically recessed with respect to said surface whereby to facilitate placement of the finger whose print is to be recorded.

8. The apparatus defined in claim 1, further including a latch means for engaging said table means to prevent said pivotal movement when desired, as when a print of a plurality of fingers is to be taken.

References Cited

UNITED STATES PATENTS

| | | | |
|---|---|---|---|
| 1,122,570 | 12/1914 | Bell | 269—62 X |
| 1,166,243 | 12/1915 | Norton et al. | 269—62 X |
| 1,198,667 | 9/1916 | Ryan | 118—503 |
| 1,251,113 | 12/1917 | Ryan | 118—31.5 |
| 1,388,408 | 8/1921 | Crosbie | 269—62 X |
| 1,509,164 | 9/1924 | Mivelaz | 118—503 |
| 1,516,119 | 11/1924 | Rooney | 118—503 |
| 1,743,641 | 1/1930 | Waggener | 118—503 |
| 2,294,933 | 9/1942 | Pursell | 118—503 |
| 2,727,325 | 12/1955 | Jurinic | 118—503 |

MORRIS KAPLAN, *Primary Examiner.*

U.S. Cl. X.R.

269—62